United States Patent
Danihelka et al.

(10) Patent No.: US 11,144,505 B2
(45) Date of Patent: Oct. 12, 2021

(54) DATA OPERATIONS USING A CACHE TABLE IN A FILE SYSTEM

(71) Applicant: MICROSOFT TECHNOLOGY LICENSING, LLC, Redmond, WA (US)

(72) Inventors: Karel Danihelka, Redmond, WA (US); Omar Carey, Redmond, WA (US); Rajsekhar Das, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/442,357

(22) Filed: Jun. 14, 2019

(65) Prior Publication Data
US 2020/0394155 A1 Dec. 17, 2020

(51) Int. Cl.
*G06F 16/00* (2019.01)
*G06F 16/172* (2019.01)
*G06F 16/13* (2019.01)

(52) U.S. Cl.
CPC ............ *G06F 16/172* (2019.01); *G06F 16/13* (2019.01)

(58) Field of Classification Search
CPC .... G06F 16/172; G06F 16/13; G06F 11/1435; G06F 11/1415
USPC ........................................................ 707/812
See application file for complete search history.

(56) References Cited

U.S. PATENT DOCUMENTS

| 5,875,444 | A | 2/1999 | Hughes | |
|---|---|---|---|---|
| 7,844,617 | B2 * | 11/2010 | Lemar | G06F 16/166 707/759 |
| 8,700,670 | B2 * | 4/2014 | Marathe | G06F 16/9024 707/794 |
| 8,812,450 | B1 * | 8/2014 | Kesavan | G06F 16/17 707/656 |
| 9,563,418 | B1 | 2/2017 | Walton | |
| 10,719,494 | B2 * | 7/2020 | Ishizaki | G06F 16/2246 |
| 2008/0059420 | A1 * | 3/2008 | Hsu | G06F 21/64 |
| 2009/0271418 | A1 * | 10/2009 | Vaghani | G06F 16/13 |

(Continued)

FOREIGN PATENT DOCUMENTS

EP 0466389 A2 1/1992

OTHER PUBLICATIONS

"International Search Report and Written Opinion Issued in PCT Application No. PCT/US20/036531", dated Sep. 23, 2020, 11 pages.

*Primary Examiner* — Thanh-Ha Dang
(74) *Attorney, Agent, or Firm* — Shook, Hardy & Bacon, L.L.P.

(57) ABSTRACT

Methods, systems, and computer storage media for providing reduced-latency data operations in a file system. In operation, a request to perform a data operation associated with a B+ table storage of a file system is received. The file system supports the B+ table storage that is accessible using a B+ tree lookup logic for accessing B+ table data and supports a cache storage that is accessible using a cache table lookup logic for accessing cache data in the cache storage. A number of references to the location in the B+ table storage is determined. The location in the B+ table storage is associated with the request to perform the data operation. Based on determining the number of references to the location, a cache storage location to perform the data operation is accessed. The cache storage location is mapped (using the cache table) to the location in the B+ table storage.

20 Claims, 8 Drawing Sheets

(56) References Cited

U.S. PATENT DOCUMENTS

| | | | |
|---|---|---|---|
| 2010/0076940 A1* | 3/2010 | Bordawekar | G06F 16/9027 |
| | | | 707/704 |
| 2010/0082664 A1* | 4/2010 | Odaira | G06F 16/2246 |
| | | | 707/769 |
| 2010/0174690 A1* | 7/2010 | Marcotte | G06F 16/178 |
| | | | 707/695 |
| 2010/0241632 A1* | 9/2010 | Lemar | G06F 16/166 |
| | | | 707/747 |
| 2013/0282668 A1 | 10/2013 | Hsieh | |
| 2014/0258591 A1* | 9/2014 | Dunn | G06F 12/0866 |
| | | | 711/103 |
| 2017/0039231 A1* | 2/2017 | Ishizaki | G06F 16/2246 |
| 2018/0196817 A1 | 7/2018 | Maybee et al. | |

\* cited by examiner

DATA OPERATIONS USING A CACHE TABLE IN A FILE SYSTEM

BACKGROUND

Users rely on file systems for organizing data and files on computing systems. A file system, such as a resilient file system (ReFS), provides structure and logic rules to manage storage and retrieval, and, naming and grouping of data. For example, a file system, such as ReFS, can copy files (e.g., file cloning) by cloning only the metadata of the file. The file system can also track references (i.e., reference counting) from the file (and the cloned file) to data blocks on disk for performing data operations (e.g., read and write data operations) and lock the data blocks (i.e., a locking logic) when making modifications to ensure consistency. As more and more functionality are supported using file systems, data operations with reduced latency are important to improve file access performance in a file system.

SUMMARY

Various aspects of the technology described herein are generally directed to systems, methods, and computer storage media, for among other things, providing reduced-latency data operations on files (e.g., cloned files) based on a cache table that is integrated with an existing B+ table store and B+ table functionality of a file system. In particular, a cache table (e.g., hash table or hash map) maps cache storage to B+ table storage (storing B+ table data using B+ tree data structure of the file system). The cache table operates based on a cache table lookup logic that is used to perform data operations on data (file data) and temporarily store the data (cache data) using the cache table. The B+ tables operate based B+ tree lookup logic for (legacy) B+ table functionality of the file system, while cache data are periodically persisted to the B+ table storage. Using the cache table advantageously reduces the number of data operations that would otherwise have to be serialized (thus causing delays in performing file system data operations) and further maintains the existing operating environment and functionality of the file system.

By way of background, a file system (e.g., a resilient file system—ReFS) can provide the structure and logic rules used to manage storing and retrieving, and naming and grouping of data. For example, a file system, such as ReFS, can copy files (e.g., file cloning) by cloning only the metadata of the file. The file system can also track references (i.e., reference counting) from the file (and the cloned file) to data blocks on disk for performing data operations (e.g., read and write data operations) and lock the data blocks (i.e., a locking logic) when making modifications to ensure consistency. File cloning operations in this way can replace conventional cloning of files that involves copying the file. However, read and write operations (i.e., data operations) on cloned files can introduce latency (where a subsequent request for access to a file is delayed while an initial request for access to the file is being executed) in file system data operations. Cloned-file operations, especially with an accompanying locking logic of a file system and other data operations based on the existing file system environment and functionality can cause serialized access to files and thus latency. For example, the file system includes global tables and a global table interface that centrally manage and support both data operations and other data operations that trigger updates to the B+ table data on disk that lock and preclude access to the B+ table data on the disk. As such, an alternative approach for providing data operations in a file system would improve computing operations for more efficient storage and retrieval of data.

Aspects of the technical solution described in the present disclosure are directed towards improving data operations in a file system. In particular, a cache table (e.g., hash table or hash map) maps cache storage to B+ table storage (storing B+ table data using B+ tree data structure of the file system). For example, a hash table identifies cache storage locations (e.g., in-memory) that correspond to B+ table storage locations (e.g., secondary storage on disk), such that data operations (e.g., data operations for cloned files having reference count trackers) can be performed using the hash table. Data operations that modify cache data can be performed using the cache data in the cache storage with the modified cache data eventually persisted to the B+ table storage (e.g., batch B+ table storage operation). It is contemplated that the mapping between the cache storage and the B+ table storage is based on known volume locations of B+ table data stored in the B+ table storage such that the cache data locations are aligned with the locations of B+ table data for key-based access between corresponding locations in the cache storage and the B+ table storage.

Moreover, the cache table operates based on a cache table lookup logic that is used to perform data operations on files(including cloned files) and temporarily store data (cache data) using the cache table. The cache table lookup logic is faster than the B+ tree lookup logic, as such data operations can be performed faster using the cache table, and modified cache data temporarily stored in cache storage. For example, a write operation that modifies data blocks no longer trigger updates to the B+ table storage, but rather the modified data blocks are stored in cache storage and persisted periodically and efficiently to the corresponding locations in the B+ table storage. For example, a batch B+ table storage operation can include grouping and executing data operations that require locking the B+ table storage. Additionally, the B+ tables operate based B+ tree lookup logic for (legacy) B+ table functionality of the file system, while cache data are persisted to the B+ table storage. For example, the file system includes global tables and a global table interface that centrally manage and support (legacy) data operations that trigger updates to the B+ table storage In this way, the B+ tables can continue to be stored in the B+ table storage and directly accessed for non-cache-based data operations of the file system using the global table interface, while the cache data is opportunistically persisted to B+ table storage to reduce the latency of data operations in the file system.

In operation, a request to perform a data operation associated with a B+ table storage of a file system is received. The file system supports the B+ table storage that is accessible using a B+ tree lookup logic for accessing B+ table data in the B+ table storage, and supports a cache storage that is accessible using a cache table lookup logic for accessing cache data in the cache storage. The cache table lookup-logic is faster than the first B+ tree lookup logic. A number of references to the location in the B+ table storage is determined based on a reference count tracker. The location in the B+ table storage is associated with the request to perform the data operation. Based on determining the number of references to the location, a cache storage location to perform the data operation is accessed. The cache storage location is mapped (using the cache table) to the location in the B+ table storage. The cache table supports indirect access to the B+ table storage storing B+ table data in known locations of the B+ table storage, and the B+ table data are temporarily stored in corresponding cache storage locations. In addition, the B+ table storage supports periodically and efficiently committing data from the cache storage, while simultaneously supporting direct access data operations that trigger updates to the B+ table data in B+ table storage. Additional aspects of the technical solution are described below, by way of exemplary implementations, with reference to technical environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
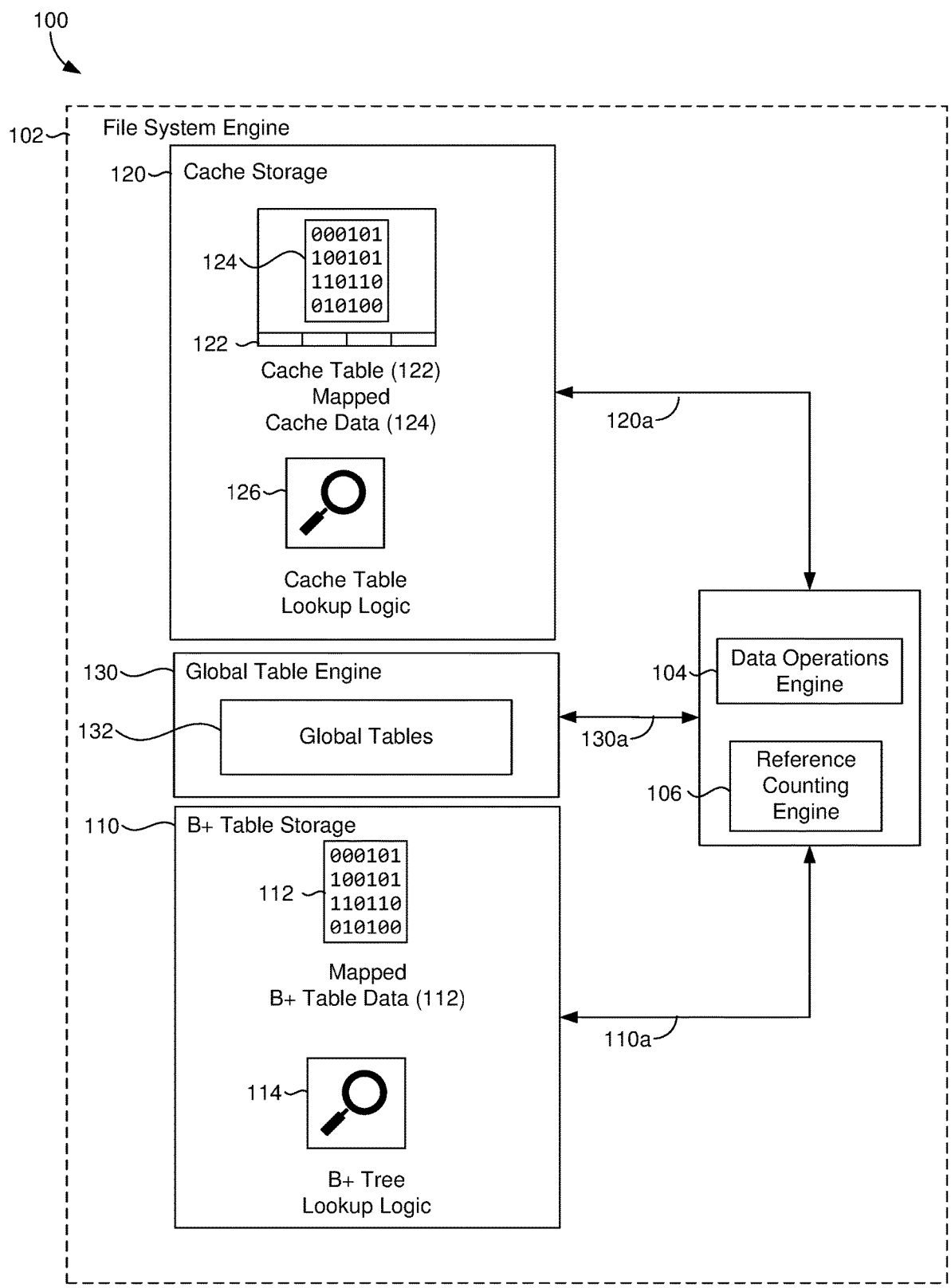
FIG. 1 is a block diagram of an exemplary environment for providing data operations in a file system, suitable for use in implementing aspects of the technology described herein.

Overview of Aspects of the Technological Improvement

A file system, such as a resilient file system (ReFS), provides structure and logic rules to manage storage and retrieval, and naming and grouping of data. The file system operates to maximize data availability, scale efficiently to large data sets across diverse workloads, and provide data integrity by means of resiliency to corruption. A file system, such as ReFS, can copy files (e.g., file cloning operation) by cloning only the metadata of the file and perform read and write operations (e.g., cloned-file operations) based on tracking references to data blocks of the file on disk (i.e., reference counting), and locking the file when making modifications (i.e., a locking logic). By way of example, a file system may support file A associated with B+ tables corresponding to data and metadata that are stored on disk (volume) such that a clone operation creates file B and simply copies metadata of file A (i.e., sequence of blocks of file A on the disk) without copying the corresponding data (e.g., user data). Even though from a user perspective it may seem like a copy has been made, in reality, only the metadata associated with the file is copied. Example use cases can include snapshotting for fast copies, backups, or VMs accessing the same virtual hard disks.

The data can be tracked using global tables and a global table interface that centrally manage the location of data (in corresponding B+ tables) on the file system. The global tables also store the reference count (e.g., in a reference count table) for all blocks on disk. As such, for each block, the reference count indicates the number of times the block is in-use as part of a corresponding file (e.g., user file). Data operations include accessing the reference count table to determine if the file (i.e., clusters) is duplicated (i.e., part of more than one file). For example, file B can be a clone of file A such that file B has access to the data of file A for read operations and for write operations. And the file system further implements reference counting of data blocks associated with the data to determine how to execute the data operations. Moreover, as additional changes are made various copies the cloned files, only specific portions (i.e., data blocks) of the cloned file are further modified, while leaving other portions of the cloned file. For example, a modification, to a data block that has two or more references from files, will trigger a copy-on-write and a copy is made of that block. The reference count is updated to reflect the change in references to the data block. If a resource is duplicated but not modified, it is not necessary to create a new resource; the resource can be shared between the copy and the original.

File cloning operations in this way can replace conventional cloning of files that involves copying the file. The file system provides a performance improvement and storage efficiency over file systems that make copies of the files. However, cloned files can be used to perform read and write operations (i.e., cloned-file operations) that introduce latency in file system data operations. An increase in clone operations bottle neck to the entire system, because a write to cluster needs to check whether cluster is referenced or not referenced, and if the cluster is referenced, a copy-on-write operation is performed, triggering an update to B+ table storage on disk.

Moreover, file cloning, as described, especially with an accompanying locking logic based on the existing file system environment and functionality, can cause serialized access to files and thus latency, where a subsequent request for access to a file is delayed while an initial request for access to the file is being executed. For example, copy-on-write operations for data blocks that are referenced by multiple clone files trigger an update to the B+ table storage on disk. While the B+ tree data structure can be an efficient way to store data on disk, a bottlenecks exists because of the volume of cloned-file operations that have to update B+ table data. Additional existing file system operations including checkpoint (e.g., a global drain operation), B+ table data storage granularity in the B+ table store, and a locking logic of the file system can further introduce latency for data operations. For example, the combination of having the layout of the B+ table data as rows contained within pages and the file system supporting a page as the lock granularity can result in independent data ranges on the same page such that an attempt to modify both of them cause serialization. The performance efficiencies of file cloning operation described above are countered by the number of input/outputs involved in file can cloning can cause latency issues. At a high level, even though having a centralized global table for managing all the tables and reference counts has implementation advantages, an increase in the data sets processed using the single global table causes latencies.

Even with a range-locking implementation, that locks only a particular range and not the entire table, other blocks within the range were being affected (again because of the volume of the data sets). As such, an alternative approach for providing data operations in a file system would improve computing operations for more efficient storage and retrieval of data.

Embodiments of the present invention are directed to simple and efficient methods, systems, and computer storage media for providing reduced-latency data operations on files (e.g., cloned files) based on a cache table that is integrated with an existing B+ table store and B+ table functionality of a file system. In particular, a cache table (e.g., hash table or hash map) maps cache storage to B+ table storage (storing B+ table data using B+ tree data structure of the file system). The cache table operates based on a cache table lookup logic that is used to perform data operations on data (file data) and temporarily store the modified data (cache data) using the cache table. The B+ tables operate based B+ tree lookup logic for (legacy) B+ table functionality of the file system, while cache data are periodically persisted to the B+ table storage. Using the cache table advantageously reduces the number of data operations that would otherwise have to be serialized (thus causing delays in performing file system data operations) and further maintains the existing operating environment and functionality of the file system.

Aspects of the technical solution can be described by way of examples and with reference to FIG. 1. FIG. 1 includes a file system engine 102, data operations engine 104, and reference counting engine 106. The file system engine 102 typically manages operations, such as storage management, file naming, directories or folders, metadata, access rules and privileges. Commonly used file systems include File Allocation Table 32 (FAT 32), New Technology File System (NTFS) and Hierarchical File System (HFS). The data operations engine 104 operates to perform data operations for files (including cloned files, as described herein) while simultaneously supporting existing functionality in the file system environment (e.g., global tables, B+ table data). The reference counting engine 106 supports counting a number of references to data blocks of cloned files. For example, for file A that is cloned into file B, data blocks of file A can be referenced by file B and the reference counting engine 106 maintains a reference count tracker (e.g., a reference count table) for tracking and updating references to the data blocks. In this regard, reference count tracker operates as an indicator that a data block is shared by file A and file B, and modifications the data block via the file B trigger performing a copy-on-write and updating the reference count tracker to remove the reference from file B to the data block. A modified data block is created with a reference from file B to the modified data block that is also tracked using the reference counting engine 106.

FIG. 1 further illustrates a B+ table storage 110, cache storage 120, and a global table engine 130 of a file system. The file system supports the B+ table storage 110 that stores B+ table data 112. The B+ table data 112 is accessible using a B+ tree lookup logic 114. At block 110a, the file system engine 102 (e.g., using the data operations engine 104) can access the B+ table storage 110 to generate (manage or update) a cache table. By way of context, cache storages store data (e.g., B+ table data) so that future requests for that data can be served faster; the data stored in a cache might be the result of an earlier computation or a copy of data stored elsewhere. A cache hit occurs when the requested data can be found in a cache, while a cache miss occurs when it cannot. Cache hits are served by reading data from the cache, which is faster than re-computing a result or reading from the B+ table storage 110; thus, the more requests that can be served from the cache, the faster the system performs. In this regard, B+ table data 112 can be stored in the cache storage and made accessible via a cache table. B+ table storage 110 can be disk secondary storage and the cache storage is in-memory primary storage, wherein B+ table storage simultaneously supports indirect delayed persisting of cache data and direct timely persisting of B+ table data.

The file system supports a cache storage 120 and a cache table 122 and stores cache data 124. The cache data 124 is accessible using a cache table lookup logic 126. For example, the cache table lookup logic 126 can be an O(1) lookup that is faster than the B+ tree lookup logic 114 that is an O(log n) lookup. The lookup logic refers to the time it takes to search and locate data (or a location) that is stored based on a particular data structure. Cache data 124 can be quickly identified using the cache table lookup logic 126 compared to the B+ table data 112 that is identified using the B+ tree lookup logic.

At block 120a, the file system engine 102 access a cache storage 120 to generate (manage or update) a cache table 122 of cache data 124 that is stored in the cache storage 120. The cache table can be a hash table that maps the known locations in the B+ table storage to the cache storage location based on a hash function. The hash function supports key-based access to the cache storage 110 locations and corresponding known locations in the B+ table storage. By way of example, for a file A, and any subsequent cloned files (e.g., file B) reference the location of data blocks stored on B+ storage 110 is known. The locations are associated a B+ tree data structure that supports storage the data block on B+ table storage (i.e., secondary storage on disk) in an efficient way. Cache data 122 of the B+ table data from the known locations on B+ table storage can be stored and accessed using the cache table 122 which can provide improved performance over the existing B+ tree data structure in the B+ table storage 110. In particular, by way of illustration, every 64 MB range (cluster) of B+ table storage 110 maps to a corresponding entry in a hash table. So for n entries (where n is an integer) in the hash table, every cluster maps to an n in the hash table. An n is a key of the hash table that can be used to identify the corresponding cluster on the B+ table storage. For the cache storage 120, a selected n can be further mapped to an array, where each entry in the array represents the data blocks in the 64 MB range that temporarily stored in the cache storage 120. In this way, each entry in the array can support interlocked operations (mutually dependent states) for a corresponding data blocks in the cache storage 120 and the B+ table storage 110.

With continued reference to FIG. 1, the file system supports a global table engine 130 (e.g., a global table interface) and global tables that centrally manage accessing and storing the B+ table data in the B+ table storage. At block 130a, the global table engine 130 (global table interface) supports simultaneous access to B+ table data for data operations associated with the cache storage and data operations not associated with the cache storage based on the global tables. For example, the global table interface supports legacy data operations or other file system data operations that are not originated or served from the cache storage 120, where those data operations continue to use the existing semantics and logic already defined in the file system. In other words, direct access (constructive direct access) to B+ table data using the global table interface is still supported for data operations that trigger updates to the B+ table data.

Direct access data operations access B+ table data based on key-value pairs, where the B+ table data have to be searched (i.e., logarithmic search or B+ tree lookup logic). As discussed, the cache table lookup logic 126 involves identifying a cache storage location using the cache table 122 on in cache storage to perform cache-based data operations, while the B+ lookup logic 114 involves searching the B+ table data based on key-pair values for non-cache data operations.

In operation, a request to perform a data operation associated with a B+ table storage of a file system is received. The data operation can be a read operation or write operation. The read operation identifies file data reference in either the cache storage 120 (cache miss) or B+ table storage (cache miss). For a write operation, the write operation can modify cache data 124 in a cache storage location. Advantageously, the modification can be made in cache storage 120 while the location in the B+ table store corresponding the cache data is inaccessible based on a locking logic of the file system, thus reducing latency in the file system. In addition, the B+ table storage 110 supports periodically and efficiently committing data from the cache storage 120, while simultaneously supporting read operations from the cache storage 120 or B+ table storage 110. For example, a batch B+ table storage operation can include grouping and executing data operations that require locking the B+ table storage to reduce bottle necks in the file system.

Aspects of the technical solution of this disclosure have been described with reference to several inventive features and advantages associated with a file system 102 having a data operations engine 104 that improves data operations in file systems. In particular, reduced-latency data operations on files is based on a cache table that is integrated with an existing B+ tree storage and functionality of a file system. Using the cache table advantageously reduces the number of data operations that would otherwise have to be serialized (thus causing delays in performing data operations) and further maintains the existing operating environment and functionality of the file system. Overall, the a practical application of aspects of the technical solution described results in improvements based on less CPU computation, smaller memory requirements, and increased flexibility in file systems.

Overview of Example Environments for Providing
Data Operations in a File System

Figure 2:
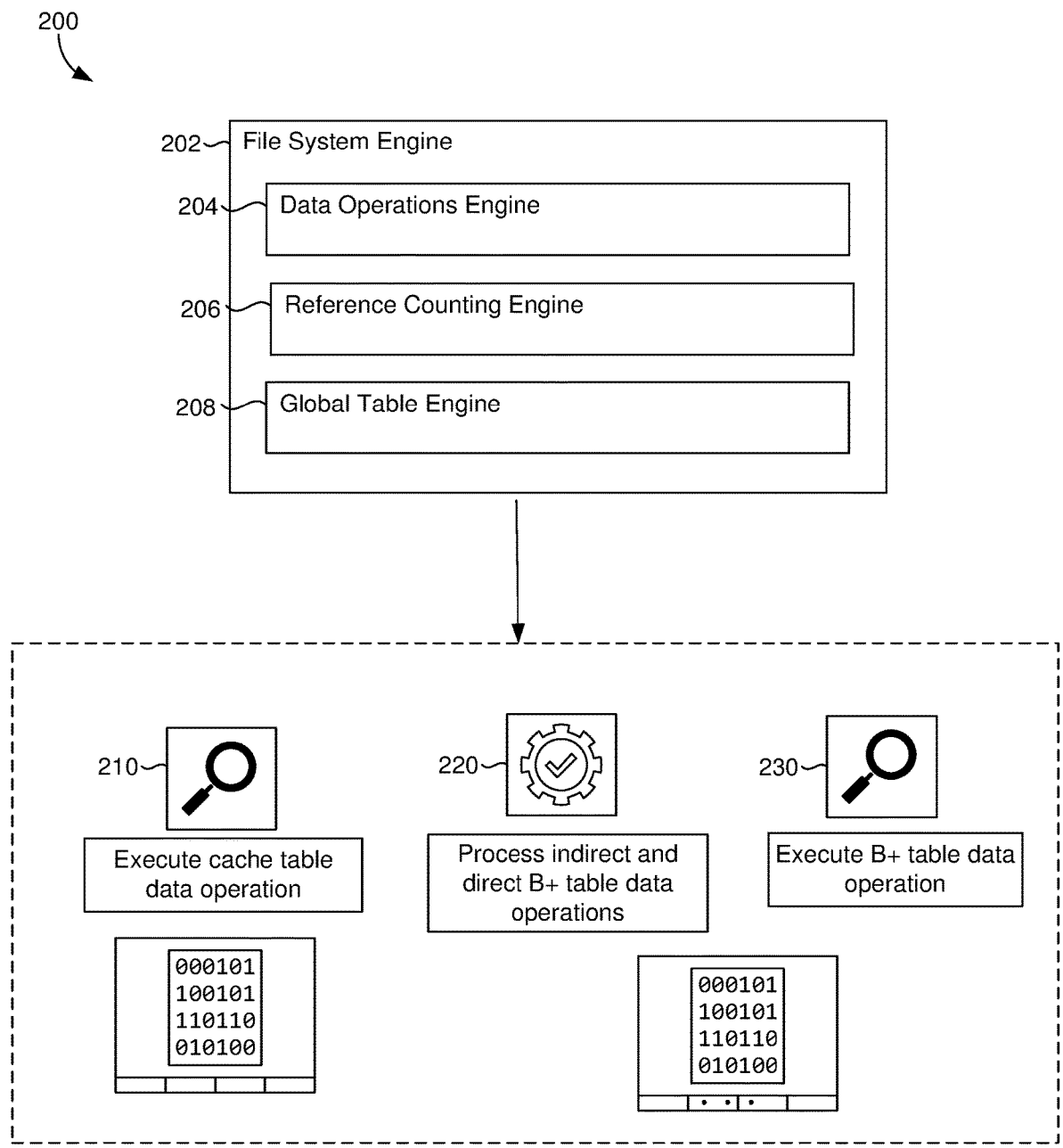
FIG. 2 is an exemplary file system engine in accordance with aspects of the technology described herein.

Turning to FIG. 2, a block diagram of an exemplary technical solution environment (file system environment 200) suitable for use in implementing embodiments of the technical solution are shown. Generally the technical solution environment includes a technical solution system suitable for providing data operations in file systems. The file system environment 200 includes a file system engine 202 having a data operations engine 204, reference counting engine 206, and global table engine 208 that align with corresponding engine discussed with reference to FIG. 1.

In operation, the data operations engine 204 can access a request to perform a data operation associated with a B+ table storage of a file system. The file system supports the B+ table storage that is accessible using a B+ tree lookup logic 230 for accessing B+ table data in the B+ table storage, and supports a cache storage that is accessible using a cache table lookup logic 210 for accessing cache data in the cache storage. The data operations engine 204 can access a number of references to the location in the B+ table storage based on a reference count tracker of the reference counting engine 206. The reference counting engine 106 supports counting a number of references to data blocks of cloned files. For example, for file A that is cloned into file B, data blocks of file A can be referenced by file B and the reference counting engine 106 maintains a reference count tracker (e.g., a reference count table) for tracking and updating references to the data blocks. The location in the B+ table storage is associated with the request to perform the data operation. Based on determining the number of references to the location, a cache storage location to perform the data operation is accessed. The cache storage location is mapped (using the cache table) to the location in the B+ table storage.

The data operation engine 204 access the global table engine 208 to process both indirect and direct B+ table data operations. For example, the cache table supports indirect access to the B+ table storage storing B+ table data in known locations of B+ table storage, and the B+ table data are temporarily stored in corresponding cache storage locations. In addition, global table engine 208 supports periodically and efficiently committing data from the cache storage, while simultaneously supporting direct access data operations that trigger updates to the B+ table data in B+ table memory. Direct access data operations access B+ table data based on key-value pairs, where the B+ table data have to be searched based on key-pair values for non-cache data operations.

Exemplary Methods for Providing Data Operations
in a File System

Figure 3:
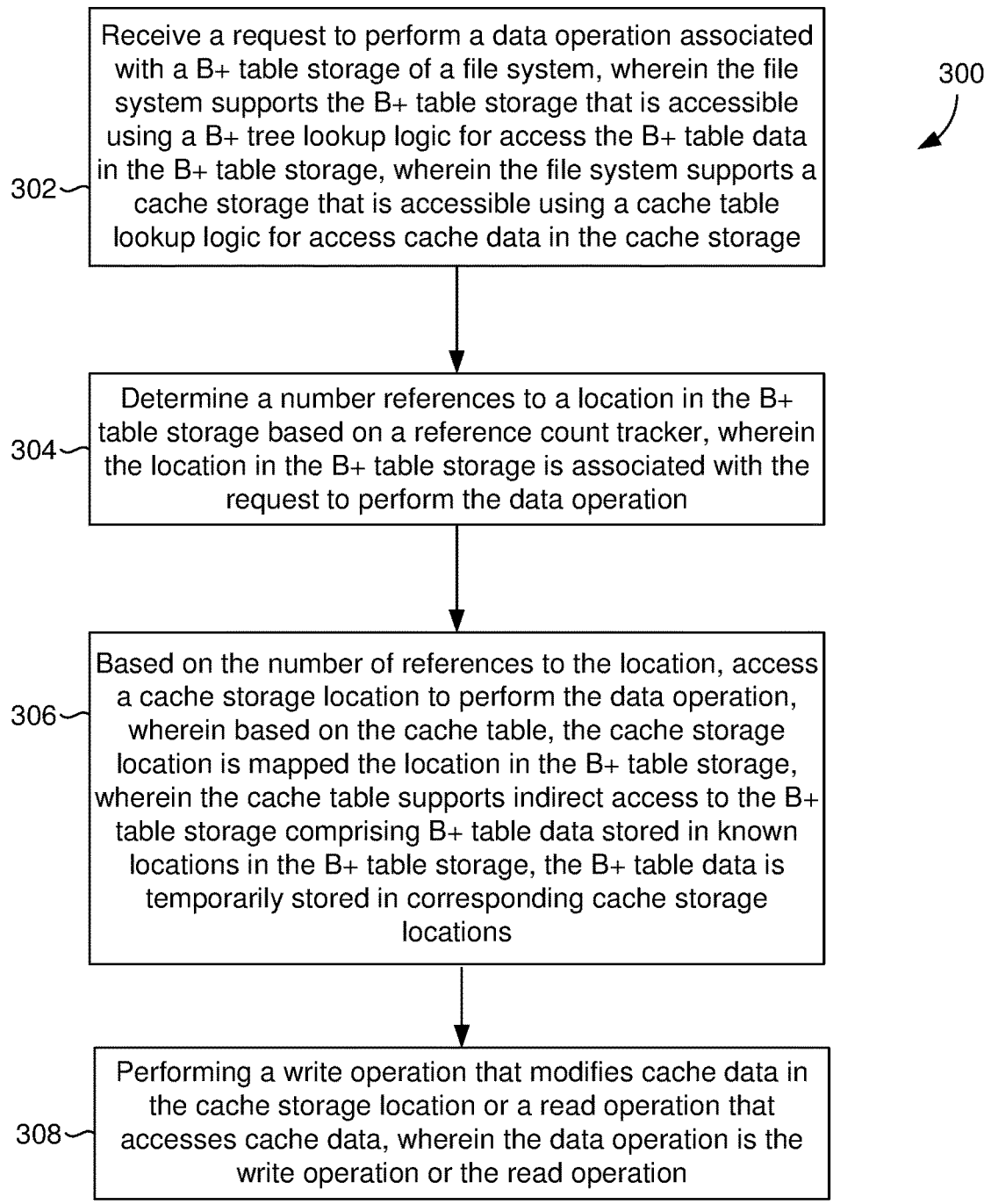
FIG. 3 provides a first exemplary method of providing data operations in a file system in accordance with aspects of the technology described herein.
Figure 4:
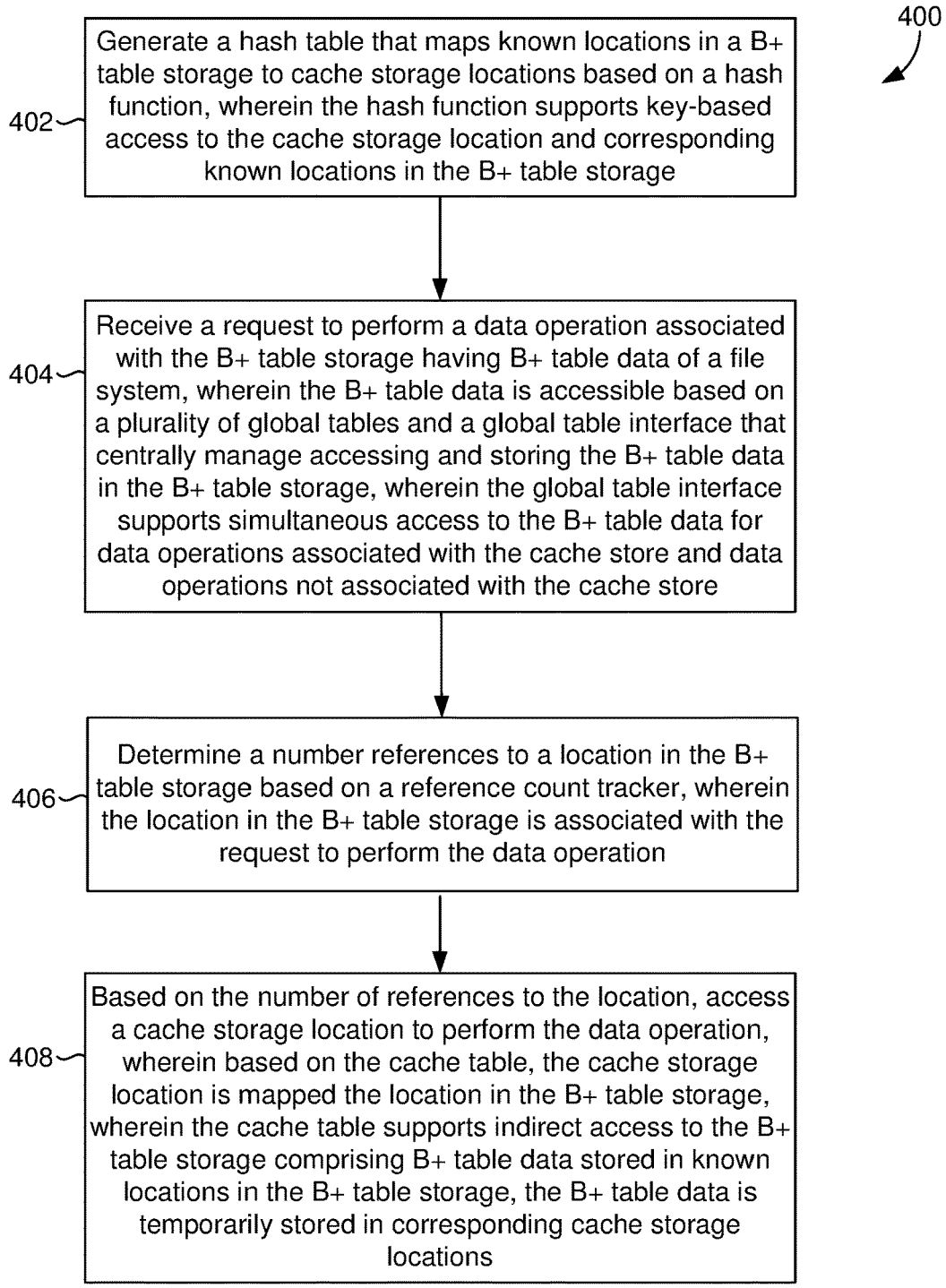
FIG. 4 provides a second exemplary method of providing data operations in a file system, in accordance with aspects of the technology described herein.
Figure 5:
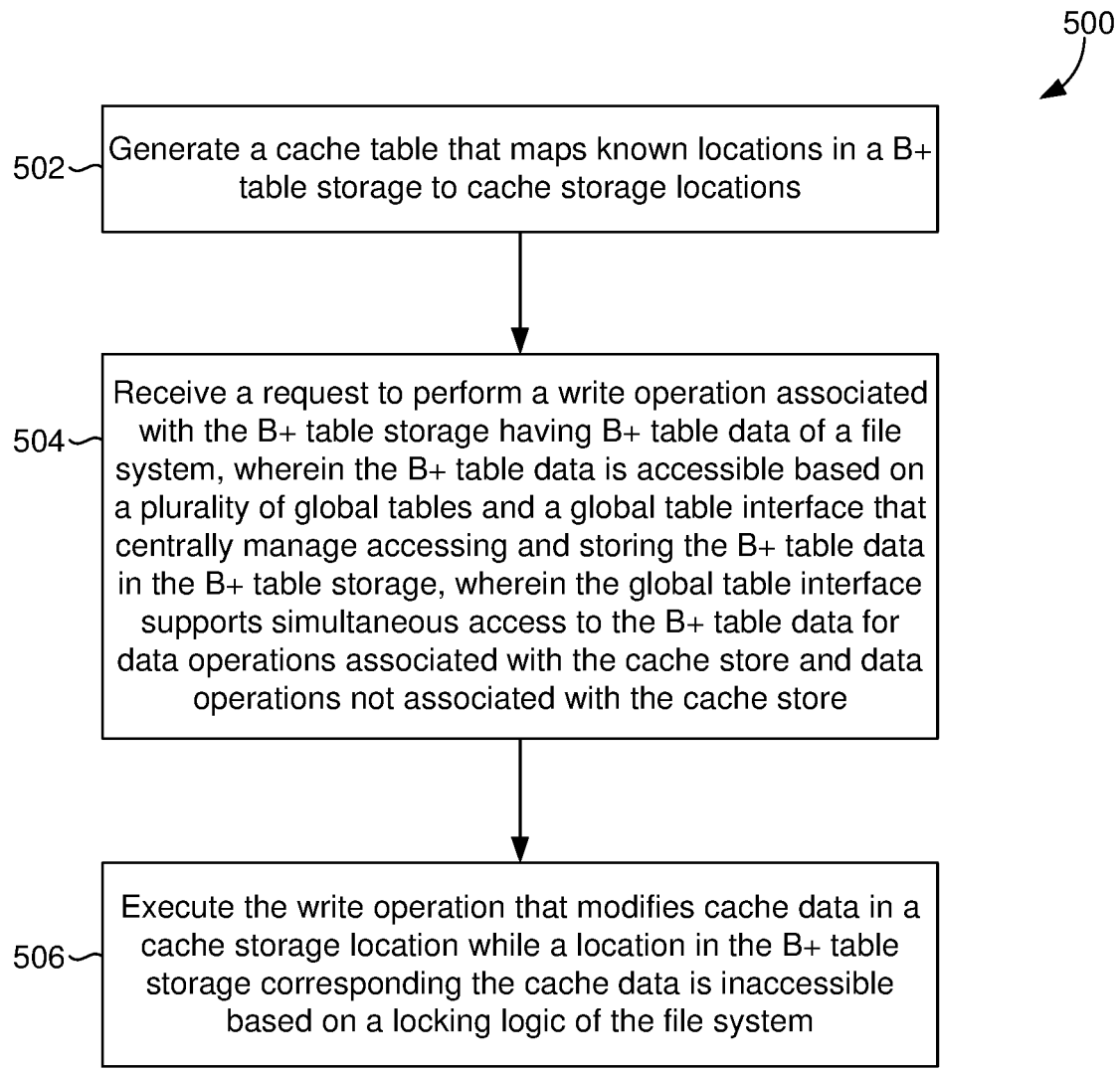
FIG. 5 provides a third exemplary method of providing data operations in a file system, in accordance with aspects of the technology described herein.

With reference to FIGS. 3, 4 and 5, flow diagrams are provided illustrating methods for data operations in a file system. The methods may be performed using the search system described herein. In embodiments, one or more computer storage media having computer-executable instructions embodied thereon that, when executed, by one or more processors can cause the one or more processors to perform the methods in the file system.

Turning to FIG. 3, a flow diagram is provided that illustrates a method 300 for providing data operations in a file system. Initially at block 302, a request to perform a data operation associated with a B+ table storage of a file system is received. The file system supports the B+ table storage that is accessible using a B+ tree lookup logic for access the B+ table data in the B+ table storage. The file system supports a cache storage that is accessible using a cache table lookup logic for access cache data in the cache storage. At block 304, a number references to a location in the B+ table storage is determined based on a reference count tracker. The location in the B+ table storage is associated with the request to perform the data operation, At block 306, based on the number of references to the location, a cache storage location to perform the data operation is accessed. Based on the cache table, the cache storage location is mapped the location in the B+ table storage, the cache table supports indirect access to the B+ table storage comprising B+ table data stored in known locations in the B+ table storage, the B+ table data is temporarily stored in corresponding cache storage locations. At block 308, a write operation that modifies cache data in the cache storage location is performed, or a read operation that accesses cache data is performed, wherein the data operation is the write operation or the read operation.

Turning to FIG. 4, a flow diagram is provided that illustrates a method 400 for providing data operations in a file system. Initially at block 402, a hash table that maps known locations in a B+ table storage to cache storage locations based on a hash function is generated. The hash function supports key-based access to the cache storage location and corresponding known locations in the B+ table storage. At block 404, a request to perform a data operation associated with the B+ table storage having B+ table data of a file system is received. The B+ table data is accessible based on a plurality of global tables and a global table interface that centrally manage accessing and storing the B+ table data in the B+ table storage. The global table interface supports simultaneous access to the B+ table data for data operations associated with the cache store and data operations not associated with the cache store.

At block 406, a number references to a location in the B+ table storage is determined based on a reference count tracker. The location in the B+ table storage is associated with the request to perform the data operation. At block 408, based on the number of references to the location, a cache storage location to perform the data operation is accessed. Based on the cache table, the cache storage location is mapped the location in the B+ table storage, the cache table supports indirect access to the B+ table storage comprising B+ table data stored in known locations in the B+ table storage, the B+ table data is temporarily stored in corresponding cache storage locations.

Turning to FIG. 5, a flow diagram is provided that illustrates a method 500 providing data operations in a file system. Initially at block 502, a cache table that maps known locations in a B+ table storage to cache storage locations is generated. At block 504, a request to perform a write operation associated with the B+ table storage having B+ table data of a file system is received. The B+ table data is accessible based on a plurality of global tables and a global table interface that centrally manage accessing and storing the B+ table data in the B+ table storage, the global table interface supports simultaneous access to the B+ table data for data operations associated with the cache store and data operations not associated with the cache store. At block 506, the write operation is performed, the write operation that modifies cache data in a cache storage location while a location in the B+ table storage corresponding the cache data is inaccessible based on a locking logic of the file system Example File System Environment With reference to the file system environment 600 that includes a file system (e.g., Resilient File System—ReFS), embodiments described herein support the functionality of the technical solution described above. The file system environment 600 includes distributed components of the file system that are communicatively implemented in combination with other integrated components that implement aspects of the technical solution. The file system environment 600 refers to the hardware architecture and software framework that support the functionality of the technical solution.

At a high level, the file system provides configuration rules (e.g., logic and data structures) used to manage storage and retrieval, and naming and grouping of data. In particular, the configuration rules are based on a copy-on-write (i.e., write-to-new) design. In this regard, the file system is a copy-on-write file system. In particular, an application programming interface operates with a storage engine to provide a write-to-new B+ key-value file system. The file system can support data integrity, file-level snapshots ("block cloning"), data tiering and dynamic layout on disks, among other functionality.

Figure 6:
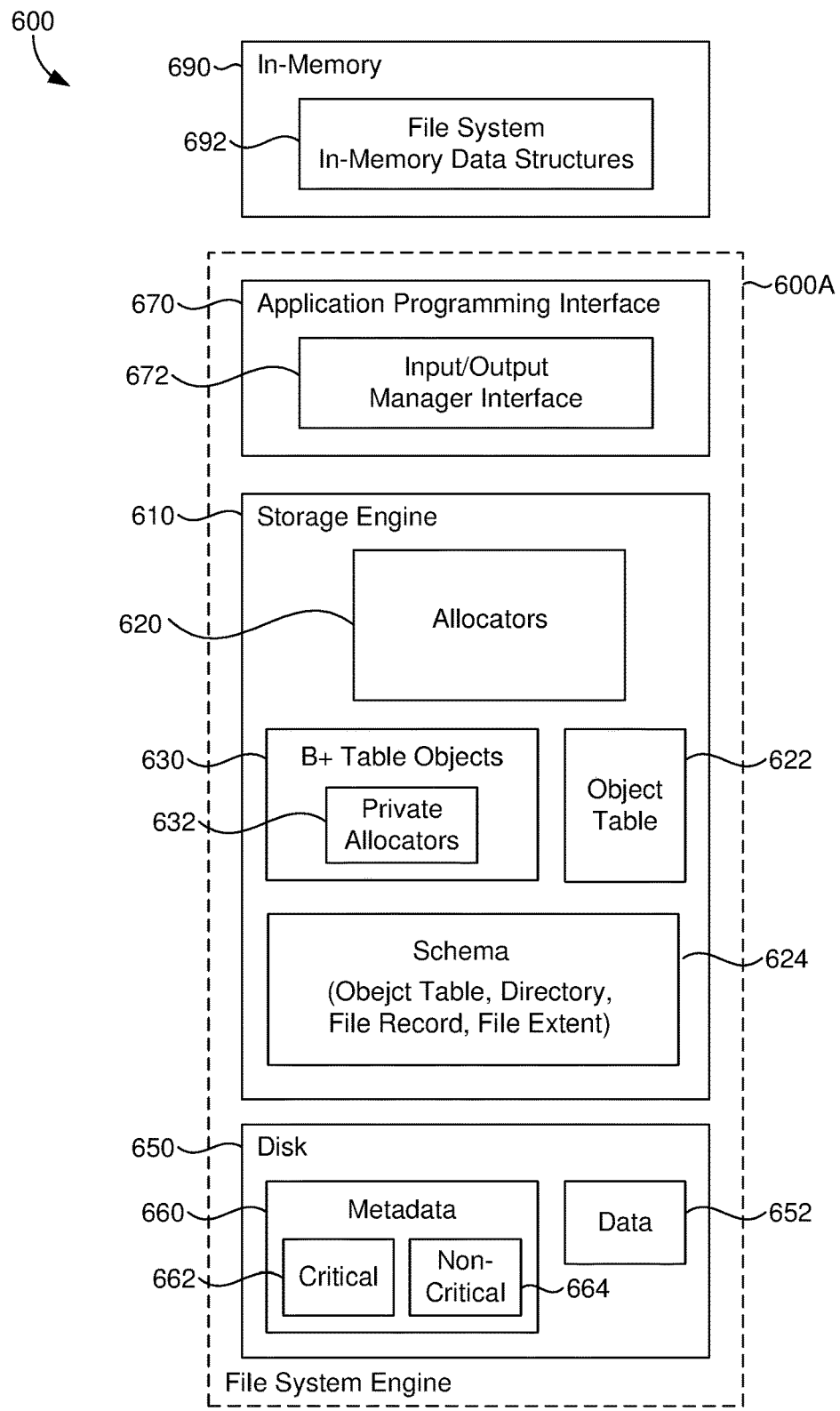
FIG. 6 provides a block diagram of an exemplary file system environment suitable for use in implementing aspects of the technology described herein.

FIG. 6 shows a high level architecture file system environment 600 having components in accordance with implementations of the present disclosure. It should be understood the arrangement described herein is set forth only as examples and other arrangements, instead of those shown, are contemplated. Among other components not shown, the file system environment 600 includes file system engine 600A having storage engine 610, disk 650, application programming interface 670, and in-memory 690. The storage engine 610 includes allocators 620, object table 622, and schema 624, B+ table objects 630 (with private allocators 632), and disk 650 includes files 652, and metadata 660 (with critical (metadata) 662, non-critical (metadata) 664); API 670 includes input/output manager interface 672; and in-memory 690 having file system in-memory data structures 692.

The storage engine 610 provides allocators (e.g., global allocators and private allocator) that allocate storage of table objects. In particular, the storage engine 610 provides B+ table objects 630 with internal private allocators 632, and an object table 622 to track the B+ table objects. The storage engine 610 supports storing roots of one B+ table within another B+ table and supports stream extents. Storing roots of B+ tables within another can leave the embedded table unable to have an entry in the object table. Directories are B+ table objects referenced by the object table 622. Files are B+ tables whose roots are embedded in the row of directories. Streams are implemented as a table of file extents whose roots are embedded in the file record.

In operation, the file system creates and manipulates B+ table objects in order to store file system metadata (e.g., critical and non-critical metadata) and uses the stream extent functionality for user stream data. In particular, the file system implements two types of metadata (i.e., global "critical" metadata 662 and non-critical metadata 664). Critical metadata 662 is managed independently of non-critical metadata 664. For example, writing critical metadata 662 is based on a different logic from the non-critical metadata 664 based on the separation from the critical metadata. Writing metadata may be implemented based on a locking mechanism.

The storage engine 610 supports a schema 624 for organizing information (e.g., B+ tables of files and directories) in the file system. For example, when a B+ table is created, the table object is assigned an ID in the object table. Every entry is a <key, value> pair in the form <object_id, root_location> where object_id is the volume-unique identifier of the object and root_location is the block address of the root bucket of the table. Because all directories are durable table objects in file system, the vast majority of entries in the object table refer to directories.

Directories are B+ table objects that are responsible for a single, flat namespace. Directories logically contain files, links to files in other directories, and links to other directories. It is through directories and links to directories that the traditional hierarchical file system namespace is built. Rows in a directory table are logically of the form <key, <type, value>> where key is unique in the table, type indicates the way in which value should be interpreted, and value is then type-specific. Directories, being tables, are composed of rows.

Files 652 are stored in association with directories. For example, files 652 may have file records that are B+ tables rooted in a directory B+ table. Files in directories can appear as <key, value> pairs of the form <file_name, file_record>. In one implementation, file_name can be a Unicode string and file_record is an embedded B+ table. Embedded B+ tables in storage engine may embed only their roots in the value of another table. In this regard, a file_record is constructively the root of a table.

In-memory data structures of the file system support in-memory operations and other associated operations of the file system. At a high level, in-memory processing can be based on file objects, file control blocks (FCB) and stream control blocks (SCB). In particular, a file object points to the SCB data structure which represents a single data entity contained in a single file. The file that contains the data entity is represented by a file control block. Durable changes for the SCB and the FCB are supported using a B+ table. Every open file in file system can be implemented with a single FCB as its in-memory anchor. An open file with a single data stream also has an SCB representing that stream. The FCB, being responsible for the on-disk file record, points to the open storage engine B+ table object that represents the file. In this regard, files are B+ tables, while file attributes are rows in the B+ table.

The file system API 670 is an application programming interface through which services of the file system can be requested. For example, the input/output manger interface 672 can support read operations, write operations, metadata management operations, and maintenance operations (e.g., creating or initializing a file system, verifying the file system for integrity, and defragmentation). An operating system of a device using the file system can provide the API to support the file system operations. It is contemplated by various features of the technical solution of the present invention can be performed using file system environment 600 and other variations and combinations thereof.

Example Distributed Computing Environment

Figure 7:
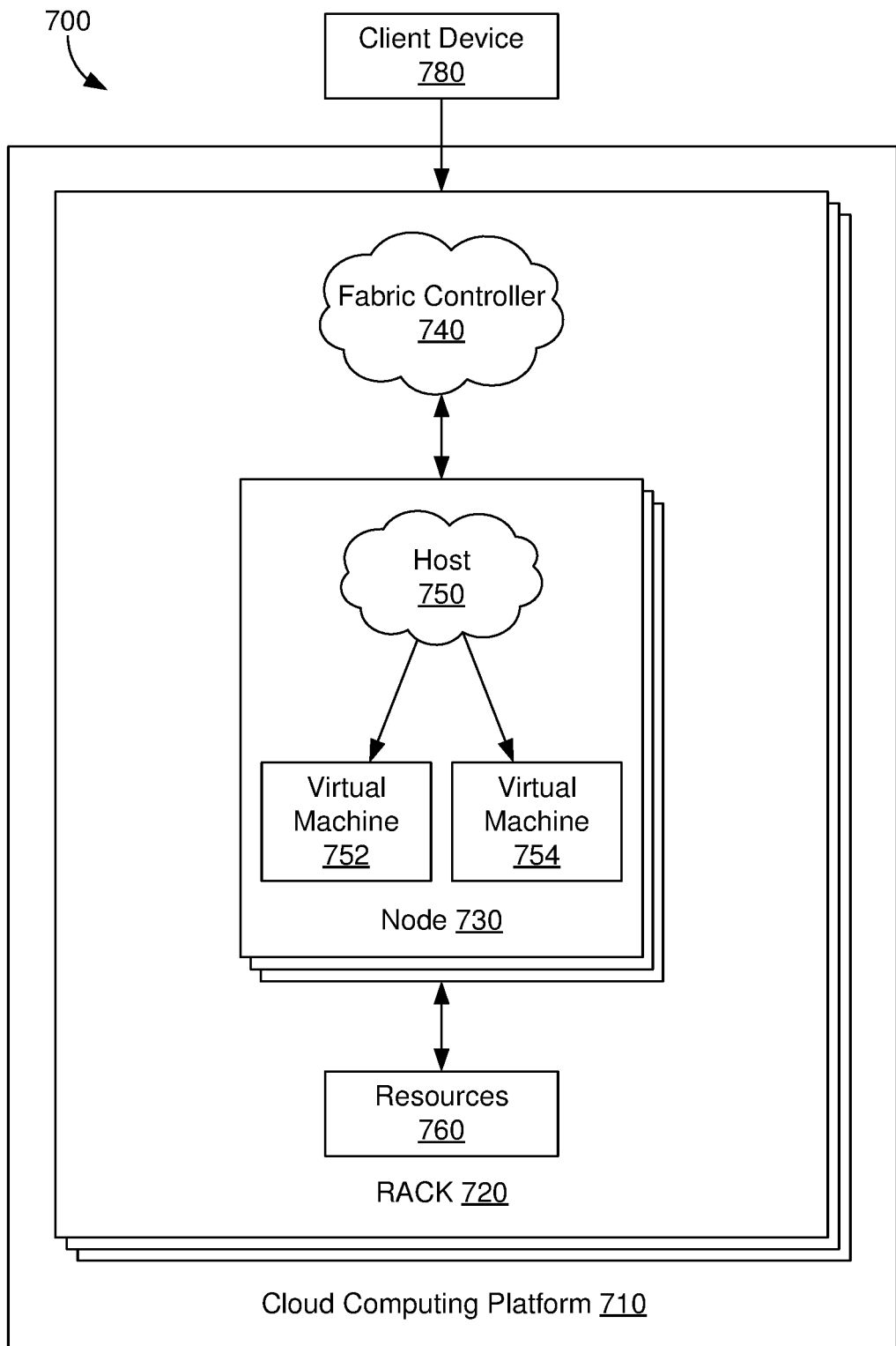
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Operating Environment

Figure 8:
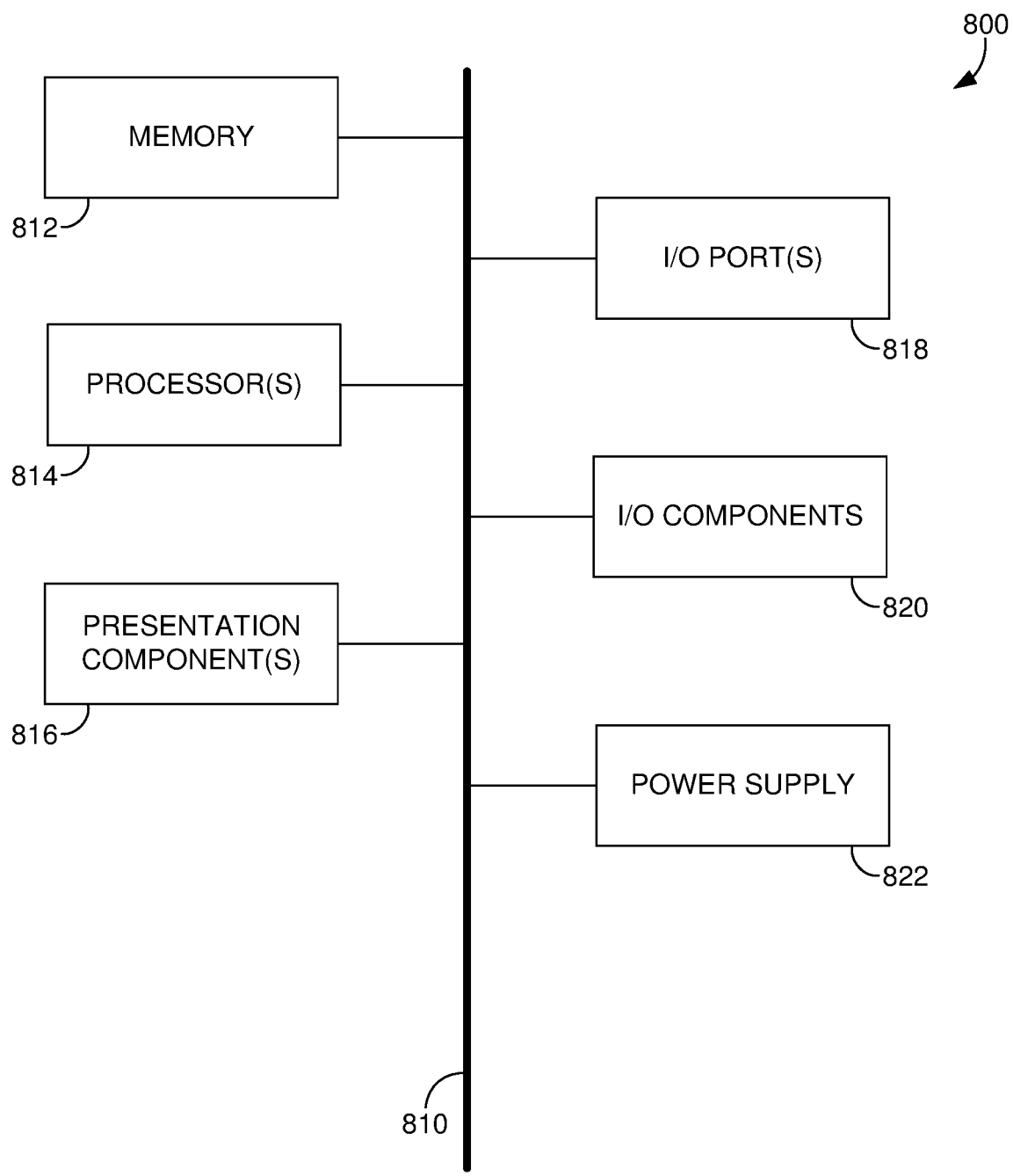
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system comprising a file system engine for providing data operations in file systems, the system comprising:
   one or more hardware processors; and
   one or more computer storage media storing computer-useable instructions that, when used by the one or more processors, cause the one or more processors to execute:
   receiving a request to perform a data operation associated with a B+ table storage of a file system, wherein the file system supports the B+ table storage that is accessible using a B+ tree lookup logic for accessing the B+ table data in the B+ table storage, wherein the file system supports a cache storage that is accessible using a lookup logic of a cache table for access cache data in the cache storage;
   determining a number references to a location in the B+ table storage based on a reference count tracker, wherein the location in the B+ table storage is associated with the request to perform the data operation; and
   based on the number of references to the location, accessing a cache storage location to perform the data operation, wherein based on the cache table, the cache storage location is mapped to the location in the B+ table storage, wherein the cache table supports indirect access to the B+ table storage comprising B+ table data stored in known locations in the B+ table storage, the B+ table data is temporarily stored in corresponding cache storage locations.

2. The system of claim 1, wherein the cache table lookup logic is an O(1) lookup that is faster than the B+ tree lookup logic that is an O(log n) lookup.

3. The system of claim 1, wherein B+ table storage is disk secondary storage and the cache storage is in-memory primary storage, wherein B+ table storage simultaneously supports indirect delayed persisting of cache data and direct timely persisting of B+ table data.

4. The system of claim 1, wherein the cache table is a hash table that maps the known locations in the B+ table storage to the cache storage location based on a hash function, wherein the hash function supports key-based access to the cache storage locations and corresponding known locations in the B+ table storage.

5. The system of claim 1, wherein reference count tracker operates as an indicator that a data block is shared by a first file and a second file, wherein the second file is a clone of the first file, wherein modifications the data block via the second file comprise performing a copy-on-write and updating the reference count tracker to remove the reference from the second file.

6. The system of claim 1, wherein the B+ table data is accessible based on a plurality of global tables and a global table interface that centrally manage accessing and storing the B+ table data in the B+ table storage, wherein the global table interface support simultaneous access to the B+ table data for data operations associated with the cache storage and data operations not associated with the cache storage.

7. The system of claim 1, wherein the data operation is a write operation that modifies cache data in the cache storage location while the location in the B+ table store corresponding the cache data is inaccessible based on a locking logic of the file system; or wherein the data operation is a read operation that provides read access to the cache data.

8. One or more computer storage media having computer-executable instructions embodied thereon that, when executed, by one or more processors, cause the one or more processors to perform a method for providing data operations in file systems, the method comprising:
- receiving a request to perform a data operation associated with a B+ table storage of a file system, wherein the file system supports the B+ table storage that is accessible using a B+ tree lookup logic for accessing the B+ table data in the B+ table storage, wherein the file system supports a cache storage that is accessible using a lookup logic of a cache table for access cache data in the cache storage;
- determining a number references to a location in the B+ table storage based on a reference count tracker, wherein the location in the B+ table storage is associated with the request to perform the data operation; and
- based on the number of references to the location, accessing a cache storage location to perform the data operation, wherein based on the cache table, the cache storage location is mapped to the location in the B+ table storage, wherein the cache table supports indirect access to the B+ table storage comprising B+ table data stored in known locations in the B+ table storage, the B+ table data is temporarily stored in corresponding cache storage locations.

9. The one or more computer storage media of claim 8, wherein the cache table lookup logic is an O(1) lookup that is faster than the B+ tree lookup logic that is an O(log n) lookup.

10. The one or more computer storage media of claim 8, wherein B+ table storage is disk secondary storage and the cache storage is in-memory primary storage, wherein B+ table storage simultaneously supports indirect delayed persisting of cache data and direct timely persisting of B+ table data.

11. The one or more computer storage media of claim 8, wherein the cache table is a hash table that maps the known locations in the B+ table storage to the cache storage location based on a hash function, wherein the hash function allows key-based access to the cache storage locations and corresponding known locations in the B+ table storage.

12. The one or more computer storage media of claim 8, wherein reference count tracker operates as an indicator that a data block is shared by a first file and a second file, wherein the second file is a clone of the first file, wherein modifications the data block via the second file comprise performing a copy-on-write and updating the reference count tracker to remove the reference from the second file.

13. The one or more computer storage media of claim 8, wherein the B+ table data is accessible based on a plurality of global tables and a global table interface that centrally manage accessing and storing the B+ table data in the B+ table storage, wherein the global table interface support simultaneous access to the B+ table data for data operations associated with the cache storage and data operations not associated with the cache storage.

14. The one or more computer storage media of claim 8, wherein the data operation is a write operation that modifies cache data in the cache storage location while the location in the B+ table store corresponding the cache data is inaccessible based on a locking logic of the file system; or wherein the data operation is a read operation that provides read access to the cache data.

15. A computer-implemented method for providing data operations in file systems, the method comprising:
- receiving a request to perform a data operation associated with a B+ table storage of a file system, wherein the file system supports the B+ table storage that is accessible using a B+ tree lookup logic for accessing the B+ table data in the B+ table storage, wherein the file system supports a cache storage that is accessible using a lookup logic of a cache table for access cache data in the cache storage;
- determining a number references to a location in the B+ table storage based on a reference count tracker, wherein the location in the B+ table storage is associated with the request to perform the data operation; and
- based on the number of references to the location, accessing a cache storage location to perform the data operation, wherein based on the cache table, the cache storage location is mapped to the location in the B+ table storage, wherein the cache table supports indirect access to the B+ table storage comprising B+ table data stored in known locations in the B+ table storage, the B+ table data is temporarily stored in corresponding cache storage locations.

16. The computer-implemented method of claim 15, wherein B+ table storage is disk secondary storage and the cache storage is in-memory primary storage, wherein B+ table storage simultaneously supports indirect delayed persisting of cache data and direct timely persisting of B+ table data.

17. The computer-implemented method of claim 15, wherein the cache table is a hash table that maps the known locations in the B+ table storage to the cache storage location based on a hash function, wherein the hash function allows key-based access to the cache storage locations and corresponding known locations in the B+ table storage.

18. The computer-implemented method of claim 15, wherein reference count tracker operates as an indicator that a data block is shared by a first file and a second file, wherein the second file is a clone of the first file, wherein modifications the data block via the second file comprise performing a copy-on-write and updating the reference count tracker to remove the reference from the second file.

19. The computer-implemented method of claim 15, wherein the B+ table data is accessible based on a plurality of global tables and a global table interface that centrally manage accessing and storing the B+ table data in the B+ table storage, wherein the global table interface support simultaneous access to the B+ table data for data operations associated with the cache storage and data operations not associated with the cache storage.

20. The computer-implemented method of claim 15, wherein the data operation is a write operation that modifies cache data in the cache storage location while the location in the B+ table store corresponding the cache data is inaccessible based on a locking logic of the file system; or wherein the data operation is a read operation that provides read access to the cache data.

* * * * *